May 13, 1952  H. L. RICHARDSON  2,596,601
APPARATUS FOR AND METHOD OF HANDLING DUSTY MATERIALS
Filed July 31, 1947  2 SHEETS—SHEET 1

INVENTOR.
Harry L. Richardson
BY
Stowell & Evans
Attorneys

May 13, 1952  H. L. RICHARDSON  2,596,601
APPARATUS FOR AND METHOD OF HANDLING DUSTY MATERIALS
Filed July 31, 1947  2 SHEETS—SHEET 2

INVENTOR.
Harry L. Richardson
BY
Stowell & Evans
Attorneys

Patented May 13, 1952

2,596,601

UNITED STATES PATENT OFFICE 2,596,601

APPARATUS FOR AND METHOD OF
HANDLING DUSTY MATERIALS

Harry L. Richardson, Bound Brook, N. J., assignor to Research Corporation, New York, N. Y., a corporation of New York Application July 31, 1947, Serial No. 764,976

12 Claims. (Cl. 183—7)

This invention relates to apparatus for and a method of handling dusty materials, and more particularly to apparatus and a method utilizing a layer or blanket of foam through which the dusty material is passed to a receiver.

An object of the invention is to provide apparatus for collecting dusty material in the dry state or in a collecting liquid wherein the collected material is separated from the material source by a layer of foam. The layer of foam is preferably supplied from a conventional foam generator. Also, the layer of foam may be applied directly to the top of a pile of collected dusty material in a receiver, or it may be interposed anywhere in the path of the dusty material in its travel to the receiver.

Another object is to provide in a system for cleaning gases including a device, such as an electrical precipitator, for removing suspended dusty material from a gas stream and a receiver to which the dusty material is transferred from such device, a foam block interposed between the device and the receiver. The dusty material readily passes through the foam block in its travel to the receiver, but dust arriving in the receiver is effectively blocked by the foam from returning to the collecting device. Moreover, where the dust is collected in a collecting liquid in the receiver, the foam block minimizes reverse flow of vapors from the collecting liquid to the cleaning device and practically eliminates condensation of vapors in the cleaning device and undesired wetting of the surfaces of the cleaning device.

Another object is to provide a method of handling dusty materials in transferring such materials from a container or source to a receiver through an interconnecting conduit wherein a blanket or layer of foam is interposed in the path of the material being transferred.

Typically, the apparatus of the invention includes a receiver, means for introducing dusty material into the receiver, foam supply means, and means for interposing foam from said supply means in a substantially continuous layer across the path of dusty material introduced into the receiver. The method of the invention may include conveying dusty material from a supply zone to a receiving zone through an intercommunicating zone, generating a supply of foam, and interposing said foam in the path of the conveyed dusty material in the form of a substantially continuous layer extending thereacross.

The invention will be more particularly described and other of its aims, objects, and advantages will be in part apparent and in part pointed out in the following detailed description taken in connection with the accompanying drawings, wherein.

Figure 1:
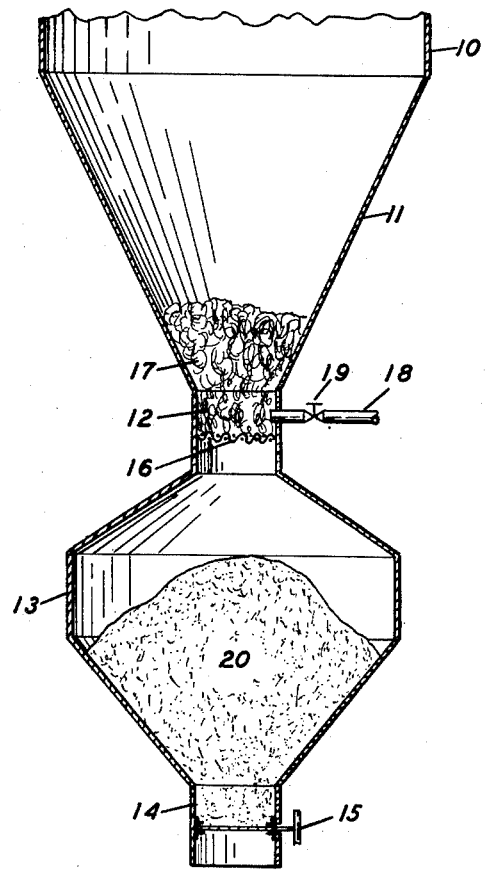
Fig. 1 is a vertical sectional view of one form of the apparatus of the invention including the lower portion of a cyclone separator and a receiving hopper positioned therebelow.

Referring now to Fig. 1 of the drawings, there is shown the lower portion 10 of a cyclone separator of conventional design. The bottom of the separator is reduced to form the conventional separating cone 11 which is connected through a vertical conduit 12 with a dust receiver 13. The lower portion of the dust receiver has an outlet 14 normally closed by a sliding gate 15 through which collected dust may be removed from the receiver as desired.

In the conduit 12 that provides communication between the cone 11 and the receiver 13, there is positioned a transverse panel 16 of woven wire screen having a relatively coarse mesh through which dusty particles removed from the gas in the cyclone separator 10 may easily pass. However, the screen is of sufficiently fine weave to support thereon a layer or blanket 17 of foam generated in a conventional foam generator (not shown) and supplied to the apparatus through an inlet pipe 18 controlled by valve 19.

In operation, dusty material is separated from the gas in separating portions 10 and 11 and falls through the layer of foam 17 and the screen 16 and into the receiver 13 where it forms a pile 20. The material falling from the separator is in the form of relatively large aggregates of sufficient density to sink rapidly through the foam layer 17, the foam layer opening to allow passage of the aggregates and closing after the aggregates have passed to maintain an effective block between the hopper 11 and the receiver 12.

Various factors such as time, and mechanical agitation tend to dissipate and destroy the layer of foam 17 which must be maintained by continuously or periodically introducing fresh supplies of foam through the pipe 18.

It will be seen that the layer of foam 17 prevents fine air-borne dust, that arises in the receiver 13 due to breaking of the aggregates, from passing upwardly through the neck 12 of the apparatus and returning to the cyclone separator.

Figure 2:
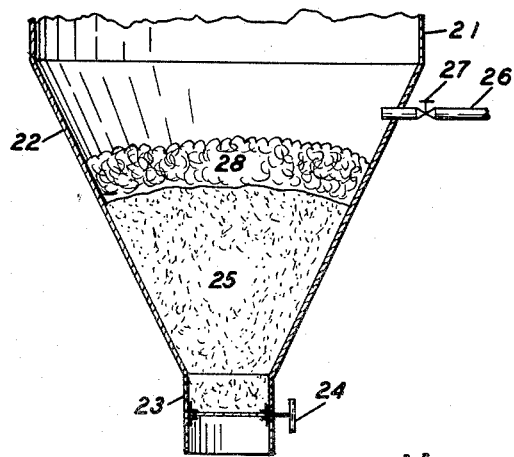
Fig. 2 is a vertical sectional view of another form of apparatus in accordance with the invention, including the lower portion of an electrical precipitator and a dust-collecting hopper.

In Fig. 2, the reference numeral 21 denotes the lower portion of a conventional electrical precipitator having a receiving hopper 22 at the bottom, the hopper being provided with an outlet 23 controlled by a sliding gate 24. Dry dusty material collected in the precipitator 21 is periodically rapped from the collecting plates and falls into the hopper 22 forming a pile 25.

In accordance with the invention, there is provided a pipe 26 supplying foam from a generator (not shown) under control of valve 27 to the upper part of the dust-receiving hopper. In order to lay the dust which would normally arise from the pile 25 and pass back to the precipitator to be re-entrained in the gas stream being cleaned, there is supplied a continuous blanket of foam 28 to the top of the pile from pipe 26. As the foam is dissipated in operation, it is replaced by admission of more foam from the pipe 26.

Figure 3:
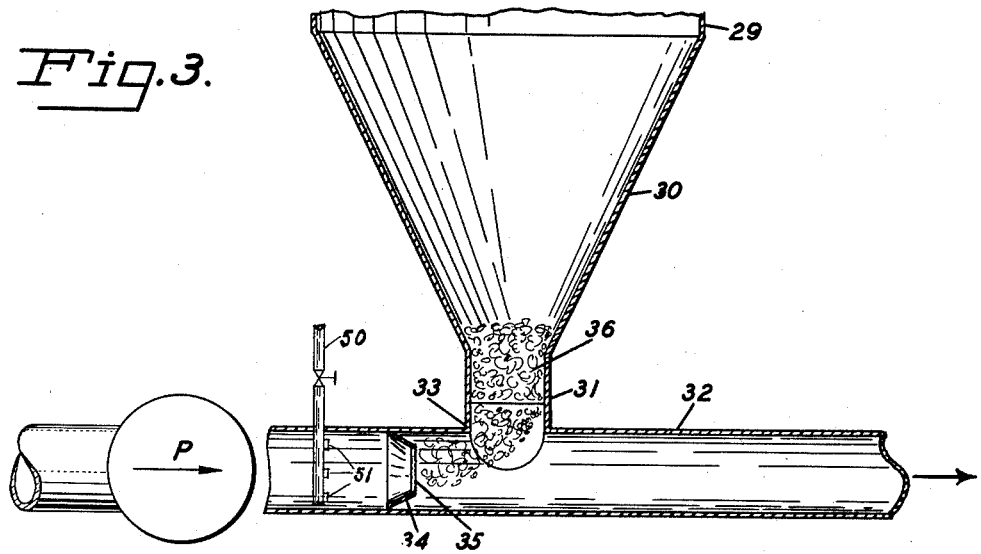
Fig. 3 is a vertical sectional view of another modification of the apparatus, including means for collecting dusty material in a stream of liquid.

Referring to Fig. 3, the apparatus shown provides for wet collection of dusty material. A dust separator 29, such as a separator for removing fly-ash from furnace gases, has a bottom portion 30 converging downwardly to a vertical pipe 31. Connected to the lower end of pipe 31 is a horizontal pipe 32 through which a collecting liquid is caused by the pump P to flow in the direction of the arrows. On the upstream side of the juncture 33 of pipes 31 and 32 there is positioned in the pipe 32 a funnel-shaped member 34 having an orifice 35 more restricted in area than the cross-section of pipe 32.

There is also located on the upstream side of the juncture 33 a valve-controlled pipe 50 having openings 51 through which foam may be introduced from a foam generator (not shown). Or a solution of foam-forming material such as soap or certain salts may be injected into a dust-collecting liquid flowing through the conduit 32 at low static head.

Where foam-forming materials, as distinguished from foam, is used, the collecting liquid containing such materials is given a turbulent motion in its passage through the orifice 35 causing the formation of foam which rises to and floats upon the surface of the liquid in the form of a layer 36. On the other hand, where foam per se is introduced, the agitator member 34 may be omitted.

The foam block 36 provides a sealing member that minimizes evaporation from the collecting liquid and reduces moisture content of the gas in the fly-ash separator 29. The relatively low humidity above the seal 36 minimizes the tendency for moisture to condense on the surfaces of the separator and to wet the separated fly-ash causing it to adhere to such surfaces and to fall from such surfaces in the form of large moist pieces. Moreover, the foam block 36 prevents splashing of the liquid up into the separator as aggregates of separated material fall into the liquid.

Figure 4:
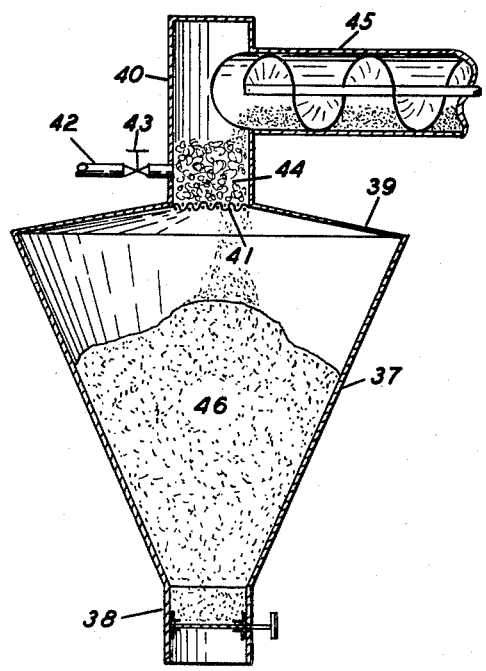
Fig. 4 is a still further modified form of dust collector embodying the principles of the invention.

Fig. 4 illustrates an application of the principles of the invention to a system wherein dusty material is transferred from a source (not shown) such as a bin to a receiver by means of a mechanical conveyor such as a screw conveyor. The receiver 37 is shown in the form of a conical hopper having a valved outlet 38 similar to the outlets of the devices of Figs. 1 and 2. A cover 39 at the top of the receiver is provided with an upstanding inlet pipe 40 closed at the top. A transverse foam-supporting screen 41 is secured across the bottom of the pipe 40 and a foam inlet pipe 42 having a valve 43 conducts foam from a generator (not shown) to the space above the screen. By actuation of the valve 43, a suitable layer of foam 44 is laid and maintained upon the screen 41 during operation.

A screw conveyor 45 conducts dusty material such as fly-ash or the like from the source (not shown) and drops the material into the pipe 40. The dusty material settles through the foam block 44 and drops through the screen 41 into the receiver 37 forming a collection pile 46. The foam block 44 is effective to eliminate reverse flow of air-suspended dust through the conveyor to the source of dusty material.

The device of Fig. 4, for example, may be modified to provide for wet collection of the dusty material in the receiver 37, in which case, the foam block not only eliminates reverse flow of suspended dust particles, but also minimizes humidity in the pipe 40, the conveyor 45 and the source of dusty material which would exist in greater degree in the absence of the foam block.

The foam supports such as the elements 16 of Fig. 1 and 41 of Fig. 4 are preferably formed of woven wire screen but may be made of any material having openings of such size and distribution as to support the foam layer while allowing dusty material to pass through. Thin metal plates having a plurality of openings formed therein may be used to advantage.

From the foregoing description it will be seen that the present invention provides apparatus and a method for preventing conditions existing in a receiving bin, or other receptacle into which dusty material is transferred from a supply source, from reaching the supply source. The difficulties caused by diffusion of vapors from the receiver into and along the dust passage to the supply source are largely obviated. Water vapor, for instance, is prevented from condensing on the surfaces on the upstream side of the foam block causing the dust to adhere to the surfaces and reduce the size of passageways, interfere with the operation of valves, coat collecting electrodes of electrical precipitators and otherwise interfere with satisfactory operating conditions on the upstream side of the foam block. Dusting conditions on the upstream side of the foam block arising from dust produced on the downstream side of the foam block are eliminated.

The foam block has unique properties that make it especially suited for sealing the receiving receptacle. It has rigidity to a useful degree; it provides a vapor seal comparable to a seal filled with a low vapor pressure liquid; it is extremely light and is easily displaced by passing solids but re-establishes itself quickly.

I claim:

1. Apparatus for handling dusty material and the like comprising a receiver, means positioned above said receiver and providing a source of dusty material, conduit means connecting said source means with said receiver through which dusty material is dropped into said receiver, and means positioned to inject foam upon the top of a pile of dusty material in said receiver in a substantially continuous covering layer.

2. Apparatus for removing suspended dusty material from a gas stream comprising means for separating and collecting suspended dusty material from the gas stream in a substantially dry condition, a receiver separate from the flow path of the gas stream in said dust separating and collecting means, means providing communication between said dust separating and collecting means and said receiver for transfer of collected dusty material therebetween, and means for interposing at a location removed from the flow path of the gas stream a substantially continuous layer of foam across the path of dusty material passing from said dust separating and collecting means to said receiver.

3. Apparatus for removing suspended dusty material from a gas stream comprising means for separating and collecting the suspended dusty material from the gas stream in a substantially dry condition, a receiver separate from said dust separating and collecting means, conduit means connecting said dust separating and collecting means with said receiver through which collected substantially dry dusty material is transferred from said separating and collecting means to said receiver, and means for interposing at a location removed from the flow path of the gas stream a substantially continuous layer of foam across the path of dusty material passing through said conduit means.

4. Apparatus for removing suspended dusty material from a gas stream comprising means for separating and collecting the suspended dusty material from the gas stream in a substantially dry condition, a receiver separate from said dust separating and collecting means, conduit means connecting said dust separating and collecting means with said receiver through which collected substantially dry dusty material is transferred from said separating and collecting means to said receiver, and means for interposing at a location removed from the flow path of the gas stream a substantially continuous layer of foam from an external source across the path of dusty material passing through said conduit means.

5. Apparatus for removing suspended dusty material from a gas stream comprising means for separating and collecting the suspended dusty material from the gas stream in a substantially dry condition, a receiver separate from and positioned below said dust separating and collecting means, substantially vertical conduit means connecting said dust separating and collecting means with said receiver through which substantially dry dusty material is dropped from said separating and collecting means into said receiver, and means for interposing at a location removed from the flow path of the gas stream a substantially continuous layer of foam across the path of dusty material falling through said conduit means.

6. Apparatus for removing suspended material from a gas stream comprising means for separating and collecting suspended dusty material from the gas stream in a substantially dry condition, a receiver separate from the flow path of the gas stream in said dust separating and collecting means, means for circulating a liquid through said receiver, means providing communication between said dust separating and collecting means and said receiver for transfer of collected dusty material therebetween, and means for interposing at a location removed from the flow path of the gas stream a substantially continuous layer of foam across the path of dusty material passing from said dust separating and collecting means to said receiver.

7. Apparatus for removing suspended dusty material from a gas stream comprising means for separating and collecting suspended dusty material from the gas stream in a substantially dry condition, substantially horizontal liquid conduit means positioned under said separating and collecting means, means for circulating a liquid through said liquid conduit means, substantially vertical conduit means establishing communication between said liquid conduit means and said separating and collecting means through which collected dusty material is dropped into said liquid conduit means, and means for interposing a substantially continuous layer of foam across the path of dusty material falling through said vertical conduit means.

8. Apparaus for removing suspended dusty material from a gas stream comprising means for separating and collecting suspended dusty material from the gas stream in a substantially dry condition, substantially horizontal liquid conduit means positioned under said separating and collecting means, means for circulating a liquid through said liquid conduit means, substantially vertical conduit means establishing communication between said liquid conduit means and said separating and collecting means through which collected dusty material is dropped into said liquid conduit means, and means for introducing foam material from an external source into said liquid conduit means relatively close to and on the upstream side of said vertical conduit means to provide foam that rises into said vertical conduit means forming a substantially continuous layer of foam upon the surface of the liquid.

9. Apparatus for removing suspended dusty material from a gas stream comprising means for separating and collecting the suspended dusty material from the gas stream in a subtantially dry condition, a receiver separate from said dust separating and collecting means, conduit means connecting said dust separating and collecting means with said receiver through which collected substantially dry dusty material is transferred from said separating and collecting means to said receiver, means extending transversely across said conduit means for supporting a layer of foam, said foam supporting means having openings through which dusty material may pass, and means for laying foam upon said foam supporting means in a substantially continuous layer at a location removed from the flow path of the gas stream.

10. Method of removing suspended dusty material from a gas stream comprising separating and collecting dusty material from the gas stream in a substantially dry condition, transferring the collected dusty material to a receiving zone separate from the gas stream through a restricted path while maintaining a substantially continuous layer of foam interposed in said restricted path at location removed from the flow path of the gas stream.

11. Method of removing suspended dusty material from a gas stream comprising electrically precipitating dusty material from the gas stream in a substantially dry condition, transferring the precipitated dry dusty material to a body of liquid in a receiving zone separate from the gas stream through a restricted path, introducing the dusty material into the body of liquid through a free surface thereof, and maintaining a substantially continuous layer of foam covering the free surface of the body of liquid at a location removed from the flow path of the gas stream.

12. Apparatus for collecting dusty material and the like comprising a receiver, means positioned above said receiver and providing a source of dusty material, conduit means connecting said source of dusty material with said receiver, said conduit means and said receiver providing a substantially free path through which dusty material drops into said receiver, and foam generating means positioned to provide a substantially continuous layer of foam across the free path of dusty material dropping into said receiver.

HARRY L. RICHARDSON.

REFERENCES CITED

The following references are of record in the file of this patent:

UNITED STATES PATENTS

| Number | Name | Date |
|---|---|---|
| 785,525 | Simpson et al. | Mar. 21, 1905 |
| 1,958,383 | Naucler et al. | May 8, 1934 |
| 2,070,578 | Bowman | Feb. 16, 1937 |
| 2,234,385 | Ryner | Mar. 11, 1941 |
| 2,379,338 | Bingman | June 26, 1945 |
| 2,379,396 | Ziliotto | June 26, 1945 |

FOREIGN PATENTS

| Number | Country | Date |
|---|---|---|
| 405,389 | Great Britain | Feb. 8, 1934 |